Feb. 25, 1964
R. C. KERSH
3,122,156
FLEXIBLE CHECK VALVE
Filed Oct. 21, 1959
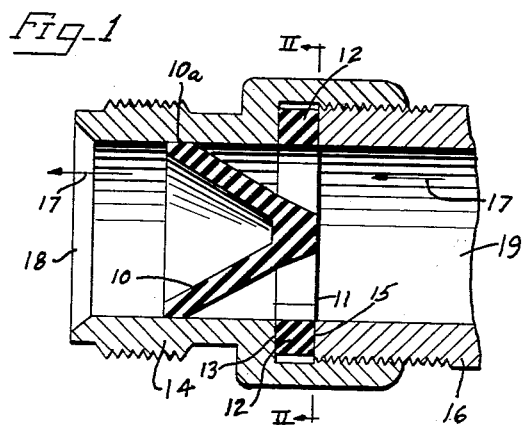
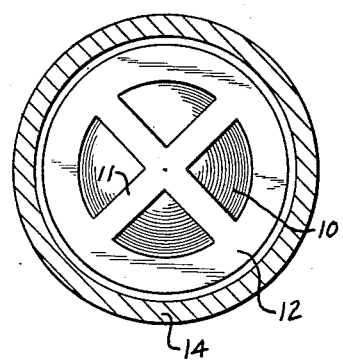
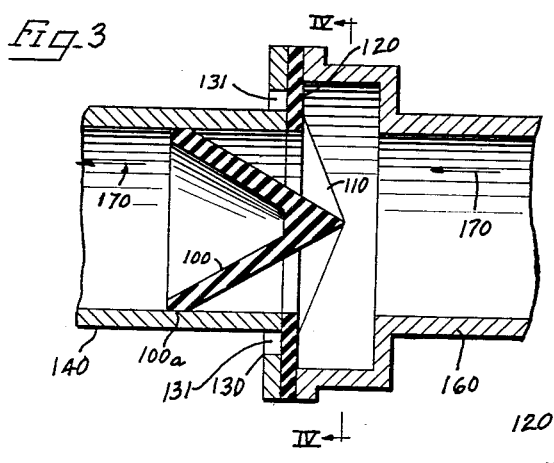
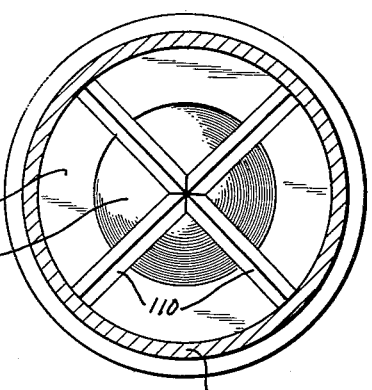
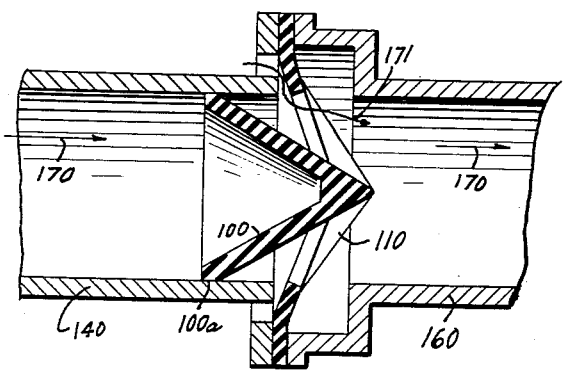
Inventor
Ronald C. Kersh

United States Patent Office 3,122,156
Patented Feb. 25, 1964

3,122,156
FLEXIBLE CHECK VALVE
Ronald C. Kersh, 11 La Campana, Orinda, Calif.
Filed Oct. 21, 1959, Ser. No. 847,761
8 Claims. (Cl. 137—218)

The present invention relates to the construction of a unidirectional flow valve and, more particularly, to a simplified and substantially improved check valve and/or anti-siphon device. This application is a continuation-in-part of my copending United States application Serial No. 522,610, filed July 18, 1955, now United States Letters Patent No. 2,912,999.

As those skilled in the art are aware, check valves or unidirectional flow valves are used very widely in all forms of fluid flow control systems. Many types of check valves have been proposed and manufactured. The tremendous quantity of such check valves required by industry has placed continuing or increasing pressure on engineers to provide simpler and more efficient forms of check valves and related devices. In accordance with the present invention, an extremely simple unitary check valve is provided which is not only simple but is also extremely efficient in operation.

In addition to the provision of a simple, efficient, check valve capable of controlling reverse flow of a fluid, either liquid or gas, in a conduit, one form of the present invention additionally provides a simple and effective means for eliminating the relatively high pressure difference across the check valve during attempted retrograde movement of the fluid. In accordance with the present invention, movement of the check valve into the valve closed position, preventing retrograde movement of fluid upon lowering of the fluid pressure at the source, causes the opening of a vent leading to atmosphere and permitting the flow of atmospheric air into the conduit between the check valve and the normal source of fluid under pressure. This flow of atmospheric air prevents high vacuum from being placed upon the system and, accordingly, completely prevents any possibility of reverse flow of fluid past the check valve. This is of particular importance in systems handling toxic materials where it is of the utmost importance that contaminated materials downstream of the check valve be prevented from passing the check valve back to the source of materials normally being added thereto.

In accordance with the principles of the present invention, a preferred embodiment of the valve comprises a generally conically configurated resilient valve member placed within a conduit in position such that the point or apex of the cone extends upstream of the normal direction of fluid flow. The cone is maintained in this position in the conduit by an annular ring secured to the cone at the upstream, pointed, end thereof by radially positioned struts. In a preferred embodiment of the invention, the struts, cone and annular ring are all integral.

In a further embodiment of the invention, the annular ring supporting the cone, above mentioned, is seated on a shoulder in the conduit facing in the upstream direction. A bleed hole is bored from the seat to outside atmosphere and upon axial movement of the cone within the conduit bore, resulting from reverse flow pressure of the fluid, the annular ring separates from the shoulder permitting atmospheric air to vent into the conduit on the normal upstream side of the conical valve member to thereby break any vacuum at that point.

It is, accordingly, an object of the present invention to provide a simplified and materially improved unidirectional flow valve for fluid.

Yet another object of the present invention is to provide a combined, simplified, check valve and anti-siphon device.

Yet a further object of the present invention is to provide an integral check valve and check valve support member constructed of resilient material.

A feature of the invention resides in the provision of a generally conically configurated check valve resiliently supported within a conduit by a resilient support member.

Another feature of the invention is the utilization of a resilient support member securing a conical check valve within a conduit for purposes of venting the normally upstream side of the check valve to atmosphere upon retrograde fluid flow; and Still a further object of the present invention is to provide a unitary check valve and anti-siphon valve mechanism for preventing all reverse flow in a fluid-carrying conduit.

Still other and further objects and features of the present invention will at once become apparent to those skilled in the art from a consideration of the attached drawings wherein preferred embodiments of the invention are shown by way of illustration only, and wherein:

FIGURE 1 is a cross-sectional, side-elevational view of a conduit coupling incorporating one form of unidirectional flow valve constructed in accordance with the principles of the present invention;

FIGURE 2 is an end elevational view of the structure illustrated in FIGURE 1 and taken along the line II—II thereof;

FIGURE 3 is a side elevational view of a second embodiment of the present invention wherein the check valve operates as an anti-siphon device;

FIGURE 4 is an end elevational view of the structure illustrated in FIGURE 3 and taken along the line IV—IV thereof and;

FIGURE 5 is a side-elevational view of the structure shown in FIGURE 3 with the parts in a second condition of operation.

As shown on the drawings:

As may be seen from a consideration of FIGURES 1 and 2, the basic form of the valve of the present invention preferably comprises a conical resilient member 10. The conical member 10 is supported resiliently by radial struts 11 secured to the pointed end thereof and extending to annular ring 12. The annular ring 12 is secured against shoulder 13 in conduit coupling member 14 by means of the end 15 of conduit section 16.

In the arrangement shown in FIGURES 1 and 2, fluid normally moves under a positive relative pressure in the direction of arrows 17. In the structure as shown, the conical portion 10 being constructed of resilient material deflects radially inwardly in a collapsing sense to permit the ready flow of fluid in the direction of arrows 17. However, upon any tendency for reverse flow, for example if the pressure at the outlet 18 of the conduit coupling becomes greater than the pressure at the inlet 19, the relative positive pressure at 18 will cause movement of the check valve toward the right as viewed in FIGURE 1 forcing the peripheral edge 10a of conical portion 10 radially outwardly against the inside surface of the conduit 14 sealing the conduit against movement in a direction opposite to the arrows 17.

In the embodiment specifically illustrated, the conical portion 10, the radial struts 11, and the annular ring member 12 are all integrally constructed of resilient material such as, for example, oil resistant rubber or the like. Accordingly, retrograde movement of the fluid in the conduit, opposite to the direction of the arrows 17, will cause slight axial movement of the conical member 10 in the direction opposite to the arrows 17. This axial movement is permitted by the resiliency in the struts 11 and provides a wiping action of the peripheral edge 10a against the internal conduit wall assuring a positive sealing action even where the hydraulic fluid contains small particles of grit or other foreign material. As a result of this integrated construction, a simple one-piece valve part is employed, eliminating all need for separate springs, ball check valve members or other similar mechanical devices subject to changing position within the conduit and, hence, faulty action.

In view of the axial movement of the resilient valve in the embodiment illustrated, for example, in FIGURES 1 and 2, a further function may profitably be incorporated into the valve device. This function is that of an anti-siphoning action. As those skilled in the art are aware, it sometimes occurs in check valves or unidirectional flow valve constructions, the source pressure, upstream of the valve, may suddenly drop to a value below the pressure on the downstream side of the check valve. In the arrangement illustrated in FIGURE 1, such a substantial reduction in pressure would initially cause an axial movement of the check valve in the upstream direction with a sealing of the peripheral edge 10a. However, extremely high relative pressures on the downstream side of the valve may in some cases cause slight leakage back past the peripheral edge 10a. Further, such conditions are aggravated by the probability that under very low pressures in the normal upstream side of the valve, vacuum conditions may be applied to the upstream side of the valve. Where the fluid downstream of the valve is a toxic material, for example, it is absolutely necessary that any fluid be prevented from leaving the toxic or contaminated area via retrograde movement past the check valve. This may positively be prevented in accordance with the principles of the present invention in an extremely simple manner illustrated in FIGURES 3, 4 and 5.

As shown in the FIGURES 3, 4 and 5, resilient conical member 100 is seated within conduit members 140 and 160 with its annular supporting ring 120 supported on shoulder 130 of conduit portion 140 in the form of the invention illustrated in FIGURES 3 and 5, the seat 130 is provided with apertures 131 and the annular ring 120 extends radially inwardly sufficiently to normally cover the apertures 131.

When the hydraulic fluid is moving in the directions of arrows 170, the conical portion 110 collapses radially, as in the embodiment of FIGURE 1, to permit ready passage of fluid. However, upon attempted retrograde movement of the fluid, the conical portion 100 expands to cause its peripheral edge 110a to slidingly engage tightly the internal conduit wall of conduit portion 140. At the same time, however, attempted retrograde movement of the fluid causes axial movement of the central portion of the valve in a direction opposite to the arrows 170 and into position shown in FIGURE 5. As there shown, the radial struts 110, being integral and accordingly resilient, stretch permitting axial movement of the conical portion of the valve. Simultaneously with this axial movement, the peripheral edge of the ring 120 lifts off the seat 130 opening apertures 131 and permitting atmospheric air to pass in the direction of arrows 171 into the upstream portion of the conduit 160. As a result of this movement, atmospheric air vents into the conduit portion 160 and positively prevents any substantial vacuum from being created within the area 160. Accordingly, any tendency for fluid within the downstream portion 140 of the conduit to pass the conical check valve portion 100 is substantially eliminated. Of course, upon increase in pressure in the upstream side of the check valve 100, the valve moves axially downstream in the direction of the arrows 170, closing openings 131 and causing operation of the valve 110 in the normal check valve relationship.

It will be apparent to those skilled in the art that variations may be made in accordance with the principles of the present invention without departing from the scope of the novel concepts thereof. For example, the area externally of the conduit, and leading to the apertures 131 in FIGURES 3, 4 and 5, may be filled with an inert gas, such as nitrogen, if atmospheric air is undesirable in the hydraulic fluid. Further, the conical portion 10 and/or 100 may be constructed of a resilient material such as rubber and molded to struts 11 and/or 110 of a separate yielding material rather than being constructed integrally with resilient rubber struts. Other changes will likewise be apparent and it is, accordingly, my intention that the scope of the present invention be limited solely by that of the hereinafter appended claims.

I claim as my invention:

1. A check valve comprising a substantially imperforate conical member of resilient material, and an integral annular ring having a diameter at least as great as that of the base of said conical portion and a plurality of resilient deflectable ribs extending radially inwardly therefrom, and the apex of said conical member being integrally joined with the intersection of said ribs, said ribs being thin relative to their radial length whereby fluid flow axially against said conical member will cause deflection of said ribs and axial wiping movement of said conical member.

2. A check valve structure comprising a fluid passing conduit, a substantially imperforate conical member of resilient material having an annular peripheral edge sealingly engaging the internal wall of said conduit and having the pointed portion thereof facing upstream of the fluid flow in said conduit, an annular ring secured to the periphery of said conduit and a plurality of resilient axially deflectable ribs extending radially inwardly from said annular ring and resiliently connected to the point of said conical member at the intersection thereof said ribs being thin relative to their radial length whereby fluid flowing in said conduit and axially contacting said conical member will cause deflection of said ribs and axial movement of said conical member to provide a wiping action of said conical member relative to said conduit.

3. A unidirectional fluid flow valve member comprising a fluid passing conduit having an annular shoulder facing upstream thereof, an annular resilient ring secured on said shoulder, a resilient conical member positioned in said conduit with the pointed end thereof extending upstream of said conduit and having the annular peripheral edge thereof in sealing contact with said conduit, and a plurality of resilient axially deflectable ribs extending radially from the pointed end of said conical member to said annular ring securing said conical portion resiliently to said ring, said ribs being thin relative to their radial length whereby fluid flow axially in said conduit will cause deflection of said ribs and axial movement of said conical member causing slight axial wiping movement thereof within said conduit.

4. A unidirectional fluid flow valve member comprising a fluid passing conduit having an annular shoulder facing upstream thereof an annular resilient ring secured on said shoulder, a resilient conical member positioned in said conduit with the pointed end thereof extending upstream of said conduit and having the annular peripheral edge thereof in sealing contact with said conduit, and a plurality of resilient deflectable ribs extending radially from said annular ring and securing said conical portion resiliently to said ring, said ribs being thin relative to their radial length whereby fluid flow axially against said conical member will cause deflection of said ribs and axial movement of said conical member to provide a wiping action thereof against said conduit, said conical member, said ring and said ribs being integrally constructed of resilient material.

5. A unidirectional fluid flow valve member comprising a fluid passing conduit having an annular shoulder facing upstream thereof, an annular resilient ring secured on said shoulder, a resilient conical member positioned in said conduit with the pointed end thereof extending upstream of said conduit and having the annular peripheral edge thereof in sealing contact with said conduit, and a plurality of resilient ribs extending radially from the pointed end of said conical member to said annular ring securing said conical portion resiliently to said ring for slight axial movement within said conduit, said shoulder having an aperture therethrough extending from the surface externally of said conduit into face-to-face relation with said annular ring, said annular ring being unseated from said aperture upon axial movement of said conical member in an upstream direction upon removal of pressure from said conduit upstream of said conical member to vent the upstream side of said conical member to the exterior of said conduit, said conical member and said ring and said ribs being integrally constructed of resilient material.

6. A check valve comprising a substantially imperforate single conical member of resilient material, an integral annular ring having a diameter at least as great as that of the base of said conical portion and secured in a fluid passing conduit upstream of said conical portion, and a plurality of resilient deflectable ribs extending radially inwardly therefrom and connected to the apex of said conical member, said ribs being thin relative to their radial length whereby fluid flow against said conical member will cause deflection of said ribs and axial movement of said conical member relative to said ring for providing a wiping action.

7. A check valve and anti-siphon device comprising a fluid passing conduit having an annular shoulder therein facing upstream of normal fluid movement, a resilient annular ring secured in said conduit with a radially inwardly projecting portion thereof normally lying resiliently against said shoulder, at least one aperture in said shoulder opening against and normally sealed by said annular ring and venting to the area externally of said conduit, a generally conical member of resilient material positioned within said conduit with the point thereof extending upstream of the fluid flow and the annular edge thereof sealingly engaging the internal wall of said conduit, and a plurality of resilient ribs extending radially from said conical member to said annular ring whereby retrograde movement of said fluid will cause axial movement of said conical member in the upstream direction and corresponding axial movement of said annular ring away from said apertures to vent the area outside of said conduit into the upstream side of said conduit.

8. A check valve device comprising a fluid passing conduit having an annular shoulder therein facing upstream of normal fluid movement, a resilient annular ring secured in said conduit with a radially inwardly projecting portion thereof normally lying resiliently against said shoulder, at least one aperture in said shoulder opening against and normally sealed by said annular ring and venting to the area externally of said conduit, a generally conical member of resilient material positioned within said conduit with the point thereof in the upstream direction and the annular edge thereof sealingly engaging the internal wall of said conduit, means connecting said conical member to said annular ring comprising a plurality of resilient deflectable ribs extending radially from said conical member to said ring, said ribs being thin relative to their length whereby fluid flow axially against said conical member will cause deflection of said ribs and axial movement of said conical member, whereby retrograde movement of said fluid will cause axial movement of said conical member in the upstream direction and corresponding movement of said annular ring away from said aperture to vent the conduit to the area outside the conduit.

References Cited in the file of this patent

UNITED STATES PATENTS

| 549,678 | Miller | Nov. 12, 1895 |
| 2,292,373 | Groeniger | Aug. 11, 1942 |
| 2,355,862 | Harper | Aug. 15, 1944 |
| 2,675,823 | Langdon | Apr. 20, 1954 |
| 2,913,000 | Roberts | Nov. 17, 1959 |

FOREIGN PATENTS

| 41,252 | Norway | Apr. 20, 1925 |